(12) United States Patent
Kato

(10) Patent No.: US 12,439,150 B2
(45) Date of Patent: Oct. 7, 2025

(54) IMAGING DEVICE, IMAGING SYSTEM, SCOPE, ENDOSCOPE SYSTEM, AND IMAGING METHOD

(71) Applicant: OLYMPUS MEDICAL SYSTEMS CORP., Hachioji (JP)

(72) Inventor: Hideki Kato, Hino (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 104 days.

(21) Appl. No.: 18/411,249

(22) Filed: Jan. 12, 2024

(65) Prior Publication Data

US 2024/0147058 A1 May 2, 2024

Related U.S. Application Data

(63) Continuation of application No. PCT/JP2021/027158, filed on Jul. 20, 2021.

(51) Int. Cl.
*H04N 23/65* (2023.01)
*H04N 23/50* (2023.01)
*H04N 25/77* (2023.01)

(52) U.S. Cl.
CPC ......... *H04N 23/651* (2023.01); *H04N 23/555* (2023.01); *H04N 25/77* (2023.01)

(58) Field of Classification Search
CPC .... H04N 23/651; H04N 23/555; H04N 25/77; H04N 23/65; H04N 25/709; A61B 1/045; G02B 23/24
See application file for complete search history.

(56) References Cited

U.S. PATENT DOCUMENTS

| | | | |
|---|---|---|---|
| 2013/0265403 A1* | 10/2013 | Okawa | A61B 1/045 348/76 |
| 2015/0280550 A1* | 10/2015 | Minakuchi | G02B 23/2484 323/234 |
| 2017/0041561 A1* | 2/2017 | Akahane | H04N 25/76 |
| 2018/0199003 A1* | 7/2018 | Shigehisa | H04N 25/76 |
| 2019/0350447 A1* | 11/2019 | Kato | H04N 25/76 |
| 2020/0052616 A1* | 2/2020 | Bosteels | H02P 6/12 |
| 2020/0412993 A1* | 12/2020 | Kawazu | H04N 25/673 |

FOREIGN PATENT DOCUMENTS

| | | |
|---|---|---|
| JP | 2009-106343 A | 5/2009 |
| JP | 2012-175484 A | 9/2012 |
| WO | 2018/167912 A1 | 9/2018 |

OTHER PUBLICATIONS

International Search Report dated Oct. 19, 2021, issued in counterpart International Application No. PCT/JP2021/027158, with English Translation. (4 pages).

* cited by examiner

*Primary Examiner* — Jason A Flohre
(74) *Attorney, Agent, or Firm* — Tsuyoshi Nakamura

(57) ABSTRACT

A first power source voltage transferred from a control unit by a power source line is input to an imaging device as a second power source voltage. The imaging device generates a first voltage in a first period and generates a second voltage in a second period. The imaging device generates a reference voltage. The imaging device outputs a first signal indicating the first voltage and the reference voltage to a video signal line and outputs a second signal indicating the second voltage and the reference voltage to the video signal line. An amount of current consumption in the imaging device in the first period is less than an amount of current consumption in the imaging device in the second period.

10 Claims, 9 Drawing Sheets

IMAGING DEVICE, IMAGING SYSTEM, SCOPE, ENDOSCOPE SYSTEM, AND IMAGING METHOD

The present application is a continuation application based on International Patent Application No. PCT/JP2021/027158 filed on Jul. 20, 2021, the content of which is incorporated herein by reference.

BACKGROUND OF THE INVENTION

Field of the Invention

The present invention relates to an imaging device, an imaging system, a scope, an endoscope system, and an imaging method.

Description of Related Art

An endoscope system includes a scope (camera unit) and a control unit. The scope and the control unit are connected to each other by a power source cable. An imager is disposed in the distal end of the scope. The control unit outputs a first power source voltage used for driving the imager to the power source cable. The first power source voltage is transferred to the scope by the power source cable and is input to the scope as a second power source voltage. Due to an influence of a current flowing through the power source cable and the resistance value of the power source cable, a voltage drop is generated in the power source cable. Therefore, the second power source voltage in the imager is lower than the first power source voltage output from the control unit.

The amount of the current flowing through the power source cable changes in accordance with the driving state of the imager. Therefore, the control unit needs to output a first power source voltage having a high value to the power source cable in light of the voltage drop generated in accordance with a change of the current. However, a first power source voltage having a high value results in an increase of power consumption in the imager and an increase of the amount of heat generation in the power source cable. Therefore, it is required that the value of the second power source voltage in the imager be monitored and a first power source voltage having an optimal value be output to the power source cable.

A method of calculating the resistance value of the power source cable and calculating the value of the second power source voltage in accordance with the following Expression (1) has been considered in order to monitor the value of the second power source voltage.

$$Vcis = Vout - Rc*Ic \quad (1)$$

In Expression (1), a voltage value Vcis indicates the value of the second power source voltage, and a voltage value Vout indicates the value of the first power source voltage. In Expression (1), a resistance value Rc indicates the resistance value of the power source cable, and a current value Ic indicates the value of the current flowing through the power source cable.

The resistance value of the power source cable changes in accordance with an individual difference of the power source cable, passage of time, a change of temperature, and the like. In the above-described method, it is necessary to calculate the resistance value of the power source cable in order to properly control the first power source voltage.

A technique disclosed in Japanese Unexamined Patent Application, First Publication No. 2012-175484 provides a method of controlling a power source voltage that is provided from a power source device to a television camera. In the technique, a capacitor is charged in order to calculate the resistance value of a power source cable, and the voltage value of the capacitor is measured. A circuit in the television camera calculates the resistance value of the power source cable.

SUMMARY OF THE INVENTION

According to a first aspect of the present invention, an imaging device is connected to a control unit by both a power source line that transfers a first power source voltage and a video signal line that transfers a video signal. The first power source voltage transferred from the control unit by the power source line is input to the imaging device as a second power source voltage. The imaging device includes an image sensor, a voltage generation circuit, a reference voltage generation circuit, and an output circuit. The image sensor is configured to generate the video signal by using the second power source voltage. The voltage generation circuit is configured to generate a first voltage by using the second power source voltage in a first period and generate a second voltage different from the first voltage by using the second power source voltage in a second period different from the first period. The reference voltage generation circuit is configured to generate a reference voltage. The output circuit is configured to output a first signal indicating the first voltage and the reference voltage to the video signal line and output a second signal indicating the second voltage and the reference voltage to the video signal line. The amount of current consumption in the imaging device in the first period is less than that of current consumption in the imaging device in the second period.

According to a second aspect of the present invention, in the first aspect, the first period may be before a timing at which the image sensor is activated. The second period may be after the timing.

According to a third aspect of the present invention, in the first aspect, the first period may be before a timing at which a control signal used for activating the image sensor is input to the image sensor. The second period may be after the timing.

According to a fourth aspect of the present invention, in the first aspect, the imaging device may further include a capacitor configured to hold the first voltage, the second voltage, and the reference voltage. The first signal may be generated based on the first voltage and the reference voltage held in the capacitor. The second signal may be generated based on the second voltage and the reference voltage held in the capacitor. According to a fifth aspect of the present invention, in the first aspect, the voltage generation circuit may include a first resistor and a second resistor. The first resistor is configured to generate the first voltage in the first period and generate the second voltage in the second period. The second resistor is configured to generate a third voltage different from the first voltage in the first period and generate a fourth voltage different from the second voltage in the second period. The output circuit may be configured to output the first signal indicating the reference voltage, the first voltage, and the third voltage generated in the first period to the video signal line. The output circuit may be configured to output the second signal indicating the reference voltage, the second voltage, and the fourth voltage generated in the second period to the video signal line.

According to a sixth aspect of the present invention, in the first aspect, the output circuit may include an analog-to-digital (AD) converter that performs AD conversion on each of the first signal, the second signal, and the video signal.

According to a seventh aspect of the present invention, an imaging system includes the imaging device and a control unit connected to the imaging device by the power source line and the video signal line. The control unit includes a power source voltage generation circuit, a signal reception circuit, and a voltage adjustment circuit. The power source voltage generation circuit is configured to generate the first power source voltage and output the generated first power source voltage to the power source line. The signal reception circuit is configured to receive the video signal, the first signal, and the second signal output to the video signal line. The voltage adjustment circuit is configured to adjust a value of the first power source voltage based on both a value of a voltage of the first signal received by the signal reception circuit and a value of a voltage of the second signal received by the signal reception circuit.

According to an eighth aspect of the present invention, a scope is to be inserted into a living body and includes the imaging device. The imaging device is disposed in a distal end of the scope.

According to a ninth aspect of the present invention, an endoscope system includes a scope to be inserted into a living body and the imaging system. The imaging device is disposed in a distal end of the scope.

According to a tenth aspect of the present invention, an imaging method is executed in an imaging device connected to a control unit by both a power source line that transfers a first power source voltage and a video signal line that transfers a video signal. The first power source voltage transferred from the control unit by the power source line is input to the imaging device as a second power source voltage used for driving an image sensor of the imaging device. The imaging method includes a voltage generation step, a reference voltage generation step, and an output step. In the voltage generation step, a voltage generation circuit generates a first voltage by using the second power source voltage in a first period and generates a second voltage different from the first voltage by using the second power source voltage in a second period different from the first period. In the reference voltage generation step, a reference voltage generation circuit generates a reference voltage. In the output step, an output circuit outputs a first signal indicating the first voltage and the reference voltage to the video signal line and outputs a second signal indicating the second voltage and the reference voltage to the video signal line. The amount of current consumption in the imaging device in the first period is less than that of current consumption in the imaging device in the second period.

DETAILED DESCRIPTION OF THE INVENTION

Hereinafter, embodiments of the present invention will be described with reference to the drawings. Each of the embodiments will be described in detail by using an endoscope system as an example of an imaging system including an imaging device.

First Embodiment

Figure 1:
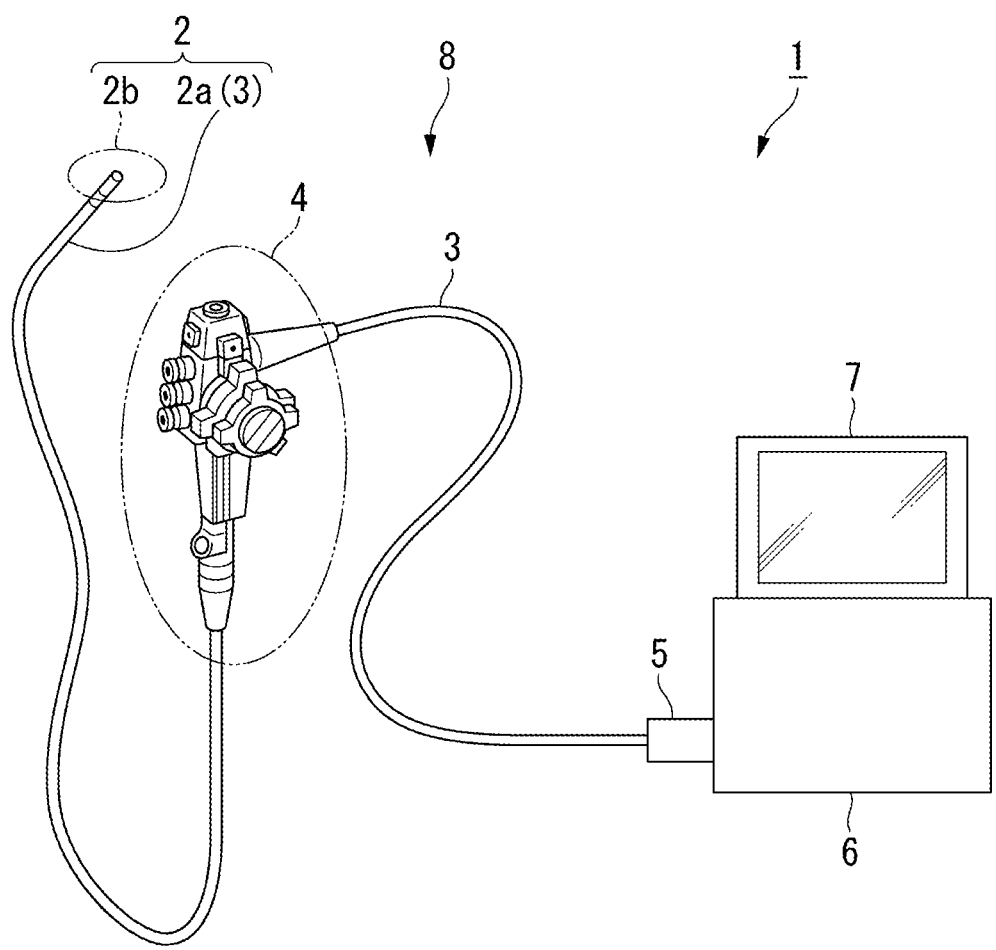
FIG. 1 is a schematic diagram showing a configuration of an endoscope system according to a first embodiment of the present invention.

FIG. 1 shows a configuration of an endoscope system 1 according to a first embodiment of the present invention. The endoscope system 1 shown in FIG. 1 includes an endoscope insertion unit 2, a transmission cable 3, an operation unit 4, a connector unit 5, a control unit 6, and a display device 7. The endoscope insertion unit 2, the transmission cable 3, the operation unit 4, and the connector unit 5 constitute a scope 8.

Figure 2:
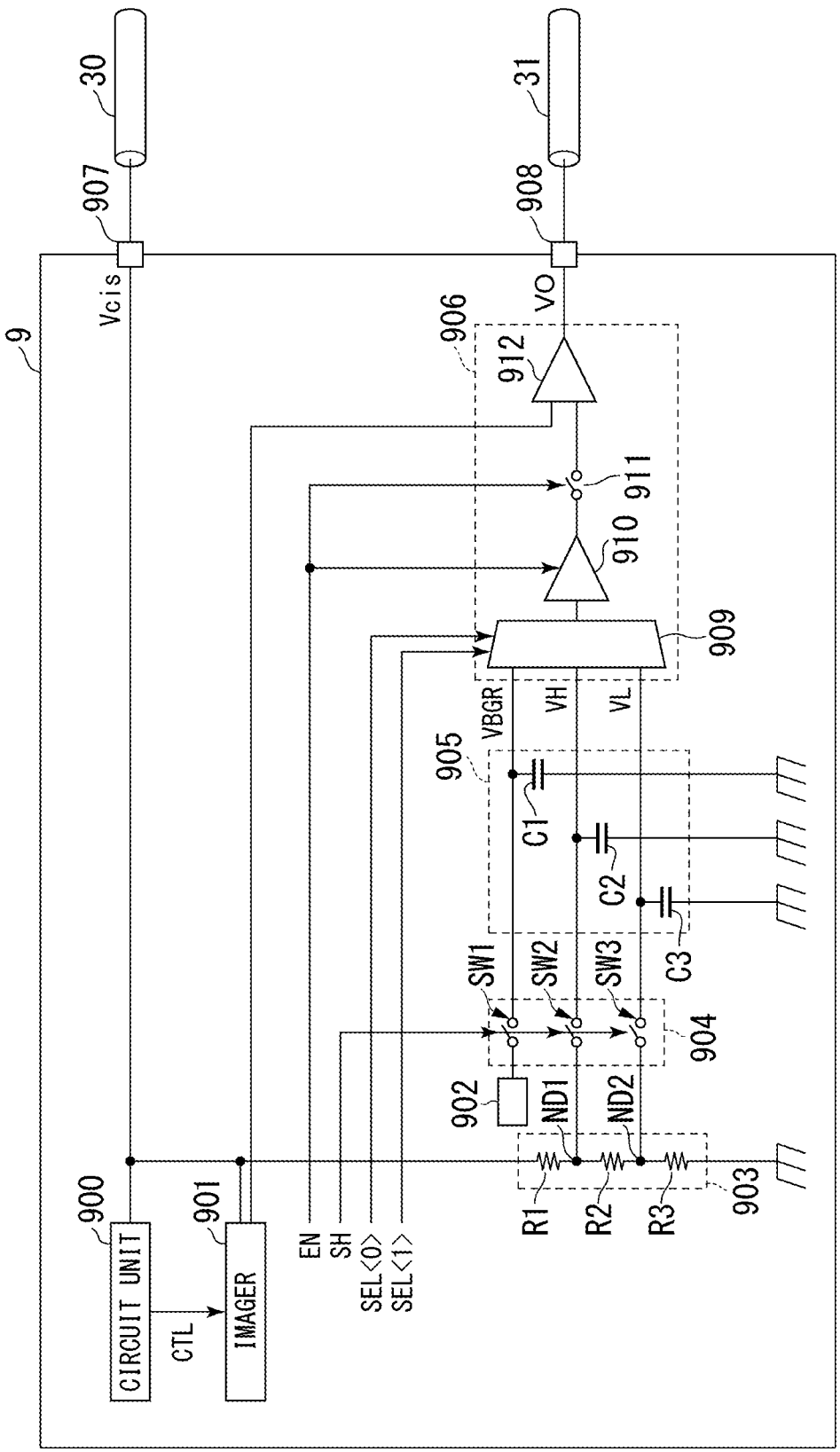
FIG. 2 is a block diagram showing a configuration of a camera unit included in the endoscope system according to the first embodiment of the present invention.

The endoscope insertion unit 2 includes an insertion unit 2a. The insertion unit 2a is part of the transmission cable 3. The insertion unit 2a is to be inserted inside a living body, which is a subject. The endoscope insertion unit 2 generates a video signal by imaging the inside of the subject. The endoscope insertion unit 2 outputs the generated video signal to the control unit 6. A camera unit 9 shown in FIG. 2 is disposed in a distal end 2b of the insertion unit 2a. In the insertion unit 2a, the operation unit 4 is connected to the proximal end part opposite the distal end 2b. The operation unit 4 receives various operations for the endoscope insertion unit 2 from a user.

The transmission cable 3 connects the camera unit 9 and the connector unit 5. The video signal generated by the camera unit 9 is output to the connector unit 5 via the transmission cable 3.

The connector unit 5 is connected to the endoscope insertion unit 2 and the control unit 6. The connector unit 5 performs predetermined processing on the video signal output from the endoscope insertion unit 2. The connector unit 5 outputs the video signal to the control unit 6.

The control unit 6 performs image processing on the video signal output from the connector unit 5. Furthermore, the control unit 6 centrally controls the entire endoscope system 1.

The display device 7 displays a video based on the video signal processed by the control unit 6. In addition, the display device 7 displays various kinds of information related to the endoscope system 1.

Figure 3:
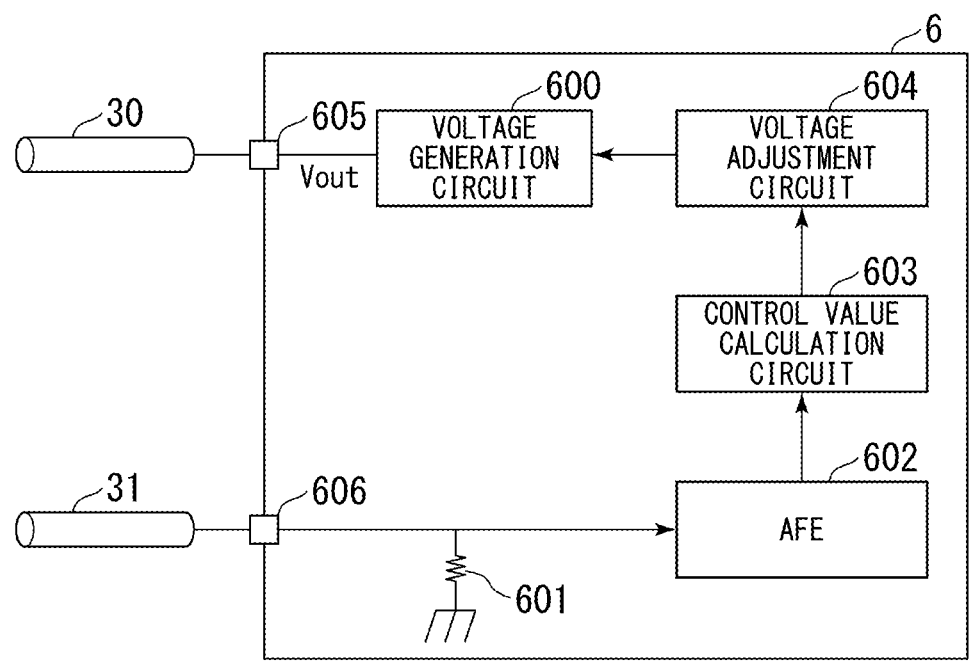
FIG. 3 is a block diagram showing a configuration of a control unit included in the endoscope system according to the first embodiment of the present invention.

The endoscope system 1 includes the camera unit 9 shown in FIG. 2 and the control unit 6 shown in FIG. 3. FIG. 2 shows a configuration of the camera unit 9. FIG. 3 shows a configuration of the control unit 6. The camera unit 9 is an imaging device. The camera unit 9 is disposed in the distal end 2b of the scope 8. The operation unit 4, the connector unit 5, and the display device 7 are not shown in FIG. 2 and FIG. 3. The transmission cable 3 shown in FIG. 1 includes a power source line 30 and a video signal line 31 shown in FIG. 2 and FIG. 3.

The endoscope system 1 includes a light source device that generates illumination light emitted to the subject. The light source device is not shown in FIG. 2 and FIG. 3.

The camera unit 9 includes a circuit unit 900, an imager 901, a voltage generation circuit 902, a resistance circuit 903, a switch circuit 904, a capacitance circuit 905, an output circuit 906, a power source terminal 907, and a video terminal 908. The resistance circuit 903 includes a resistor R1, a resistor R2, and a resistor R3. The switch circuit 904 includes a switch SW1, a switch SW2, and a switch SW3. The capacitance circuit 905 includes a capacitor C1, a capacitor C2, and a capacitor C3. The output circuit 906 includes a selection circuit 909, a buffer 910, a switch 911, and a buffer 912. All or part of the circuit unit 900, the resistance circuit 903, the switch circuit 904, the capacitance circuit 905, the output circuit 906, the power source terminal 907, and the video terminal 908 may be mounted in the circuit of the imager 901.

The control unit 6 includes a voltage generation circuit 600, a resistor 601, an analog front end (AFE) 602, a control value calculation circuit 603, a voltage adjustment circuit 604, a power source terminal 605, and a video terminal 606. All or part of the configuration of the control unit 6 shown in FIG. 3 may be disposed in the operation unit 4 or the connector unit 5 shown in FIG. 1.

A schematic configuration of the endoscope system 1 will be described. The camera unit 9 is connected to the control unit 6 by both the power source line 30 that transfers a first power source voltage Vout and the video signal line 31 that transfers a video signal. The first power source voltage Vout transferred from the control unit 6 by the power source line 30 is input to the camera unit 9 as a second power source voltage Vcis. The imager 901 generates a video signal by using the second power source voltage Vcis. The resistance circuit 903 (voltage generation circuit) generates a first voltage by using the second power source voltage Vcis in a first period. The resistance circuit 903 generates a second voltage different from the first voltage by using the second power source voltage Vcis in a second period different from the first period. The voltage generation circuit 902 (reference voltage generation circuit) generates a reference voltage VBGR. The output circuit 906 outputs a first signal indicating both the first voltage and the reference voltage VBGR to the video signal line 31 and outputs a second signal indicating both the second voltage and the reference voltage VBGR to the video signal line 31. The amount of current consumption in the camera unit 9 in the first period is less than that of current consumption in the camera unit 9 in the second period.

The video signal is output to the video signal line 31 in a video output period. For example, the video output period is a period during which the imager 901 outputs the video signal. The video output period may include a blanking period during which the imager 901 stops the output of the video signal. The output circuit 906 outputs the first signal and the second signal to the video signal line 31 in a voltage-monitoring period. The voltage-monitoring period is different from the video output period. The voltage-monitoring period includes the first period and the second period described above.

The control unit 6 is connected to the camera unit 9 by the power source line 30 and the video signal line 31. The voltage generation circuit 600 (power source voltage generation circuit) generates the first power source voltage Vout and outputs the generated first power source voltage Vout to the power source line 30. The AFE 602 (signal reception circuit) receives the video signal, the first signal, and the second signal output to the video signal line 31. The voltage adjustment circuit 604 adjusts the value of the first power source voltage Vout based on both the value of the voltage of the first signal received by the AFE 602 and the value of the voltage of the second signal received by the AFE 602.

A detailed configuration of the endoscope system 1 will be described. For example, the voltage generation circuit 600 is a voltage regulator. The voltage generation circuit 600 generates the first power source voltage Vout, which is a direct-current (DC) voltage.

The voltage generation circuit 600 is connected to the power source terminal 605. The first power source voltage Vout generated by the voltage generation circuit 600 is input to the power source terminal 605. The power source terminal 605 is connected to the power source line 30. The power source terminal 605 is disposed at a point connecting the power source line 30 and the control unit 6. The power source terminal 605 outputs the first power source voltage Vout to the power source line 30. The power source line 30 is a signal line disposed in the transmission cable 3. The power source line 30 transfers the first power source voltage Vout output from the power source terminal 605 to the camera unit 9.

The power source terminal 907 is connected to the power source line 30. The power source terminal 907 is disposed at a point connecting the power source line 30 and the camera unit 9. The first power source voltage Vout transferred by the power source line 30 is input into the power source terminal 907. The power source terminal 907 outputs the first power source voltage Vout to each circuit in the camera unit 9 as the second power source voltage Vcis. The second power source voltage Vcis is a power source voltage transferred to the camera unit 9 by the power source line 30 and is a voltage on a path from the power source terminal 907 to the imager 901. A voltage drop is generated due to the DC resistance of the power source line 30, and the second power source voltage Vcis is attenuated. Therefore, the value of the second power source voltage Vcis is less than that of the first power source voltage Vout in the control unit 6.

The circuit unit 900 includes a circuit such as a timing generator or a phase-locked loop (PLL). The timing generator generates a control signal EN, a control signal SH, a control signal SEL<0>, a control signal SEL<1>, a control signal CTL, and a clock CLK described later. The circuit unit 900 operates based on the second power source voltage Vcis.

The imager 901 is an image sensor such as a complementary metal-oxide semiconductor (CMOS) sensor. The imager 901 includes a plurality of pixels and is driven based on the second power source voltage Vcis. The imager 901 generates a video signal having a voltage generated based on the second power source voltage Vcis. The imager 901 outputs the video signal to the buffer 912 in the video output period.

The voltage generation circuit 902 generates the reference voltage VBGR based on the second power source voltage Vcis. For example, the voltage generation circuit 902 is constituted by a bandgap reference and can generate a voltage having a stable value. The voltage generation circuit 902 outputs the reference voltage VBGR to the switch SW1.

Each of the resistors R1, R2, and R3 includes a first terminal and a second terminal. The first terminal of the resistor R1 is connected to the power source terminal 907. The second power source voltage Vcis is input to the first terminal of the resistor R1. The second terminal of the resistor R1 and the first terminal of the resistor R2 are connected to each other. In addition, the second terminal of the resistor R1 and the first terminal of the resistor R2 are connected to the switch SW2. The second terminal of the resistor R1 and the first terminal of the resistor R2 constitute a node ND1.

The second terminal of the resistor R2 and the first terminal of the resistor R3 are connected to each other. In addition, the second terminal of the resistor R2 and the first terminal of the resistor R3 are connected to the switch SW3. The second terminal of the resistor R2 and the first terminal of the resistor R3 constitute a node ND2. The second terminal of the resistor R3 is connected to a ground. A ground voltage is input to the second terminal of the resistor R3.

The second power source voltage Vcis is divided by the resistors R1, R2, and R3, and a voltage VH and a voltage VL are generated. The voltage VH is output from the second terminal of the resistor R1 and the first terminal of the resistor R2. The voltage VL is output from the second terminal of the resistor R2 and the first terminal of the resistor R3. The voltage VH and the voltage VL are higher than the ground voltage and are lower than the second power source voltage Vcis. The voltage VH is higher than the voltage VL. The reference voltage VBGR is higher than the voltage VL and is lower than the voltage VH.

The state of each of the switches SW1, SW2, and SW3 becomes any one of an ON state and an OFF state. Each of the switches SW1, SW2, and SW3 can switch between the ON state and the OFF state.

The switch SW1 is connected to the voltage generation circuit 902 and the capacitor C1. The state of the switch SW1 is set to the ON state in the voltage-monitoring period. When the state of the switch SW1 is the ON state, the switch SW1 connects the voltage generation circuit 902 and the capacitor C1 to each other. At this time, the reference voltage VBGR generated by the voltage generation circuit 902 is input to the capacitor C1. Thereafter, the state of the switch SW1 is set to the OFF state. When the state of the switch SW1 is the OFF state, the switch SW1 disconnects the voltage generation circuit 902 and the capacitor C1 from each other. At this time, the capacitor C1 holds the reference voltage VBGR.

The switch SW2 is connected to the node ND1 and the capacitor C2. The state of the switch SW2 is set to the ON state in the voltage-monitoring period. When the state of the switch SW2 is the ON state, the switch SW2 connects the node ND1 and the capacitor C2 to each other. At this time, the voltage VH at the node ND1 is input to the capacitor C2. Thereafter, the state of the switch SW2 is set to the OFF state. When the state of the switch SW2 is the OFF state, the switch SW2 disconnects the node ND1 and the capacitor C2 from each other. At this time, the capacitor C2 holds the voltage VH.

The switch SW3 is connected to the node ND2 and the capacitor C3. The state of the switch SW3 is set to the ON state in the voltage-monitoring period. When the state of the switch SW3 is the ON state, the switch SW3 connects the node ND2 and the capacitor C3 to each other. At this time, the voltage VL at the node ND2 is input to the capacitor C3. Thereafter, the state of the switch SW3 is set to the OFF state. When the state of the switch SW3 is the OFF state, the switch SW3 disconnects the node ND2 and the capacitor C3 from each other. At this time, the capacitor C3 holds the voltage VL.

The state of each of the switches SW1, SW2, and SW3 is controlled based on the control signal SH. When the voltage of the control signal SH is a high (H) level, the state of each of the switches is set to the ON state. When the voltage of the control signal SH is a low (L) level, the state of each of the switches is set to the OFF state.

The capacitor C1 is connected to the switch SW1 and the selection circuit 909. When the reference voltage VBGR is held in the capacitor C1, the capacitor C1 outputs the reference voltage VBGR to the selection circuit 909.

The capacitor C2 is connected to the switch SW2 and the selection circuit 909. When the voltage VH is held in the capacitor C2, the capacitor C2 outputs the voltage VH to the selection circuit 909.

The capacitor C3 is connected to the switch SW3 and the selection circuit 909. When the voltage VL is held in the capacitor C3, the capacitor C3 outputs the voltage VL to the selection circuit 909.

The selection circuit 909 is connected to the capacitor C1, the capacitor C2, the capacitor C3, and the buffer 910. The selection circuit 909 selects any one of the reference voltage VBGR, the voltage VH, and the voltage VL and outputs the selected voltage to the buffer 910 in the voltage-monitoring period.

The state of the selection circuit 909 is controlled based on the control signal SEL<0> and the control signal SEL<1>. When the voltage of the control signal SEL<0> is the H level and the voltage of the control signal SEL<1> is the H level, the selection circuit 909 selects the voltage VH. When the voltage of the control signal SEL<0> is the L level and the voltage of the control signal SEL<1> is the H level, the selection circuit 909 selects the reference voltage VBGR. When the voltage of the control signal SEL<0> is the H level and the voltage of the control signal SEL<1> is the L level, the selection circuit 909 selects the voltage VL.

The buffer 910 is connected to the selection circuit 909 and the switch 911. The state of the buffer 910 becomes any one of an ON state and an OFF state. The buffer 910 can switch between the ON state and the OFF state.

The state of the buffer 910 is set to the ON state in the voltage-monitoring period. When the state of the buffer 910 is the ON state, the buffer 910 outputs the voltage selected by the selection circuit 909 to the switch 911. The voltage is the reference voltage VBGR, the voltage VH, or the voltage VL. When the state of the buffer 910 is the OFF state, the buffer 910 stops the output of the voltage.

The state of the buffer 910 is controlled based on the control signal EN. When the voltage of the control signal EN is the H level, the state of the buffer 910 is set to the ON state. When the voltage of the control signal EN is the L level, the state of the buffer 910 is set to the OFF state.

The switch 911 is connected to the buffer 910 and the buffer 912. The state of the switch 911 becomes any one of an ON state and an OFF state. The switch 911 can switch between the ON state and the OFF state.

The state of the switch 911 is set to the ON state in the voltage-monitoring period. When the state of the switch 911 is the ON state, the switch 911 connects the buffer 910 and the buffer 912 to each other. At this time, the reference voltage VBGR, the voltage VH, and the voltage VL output from the buffer 910 are input to the buffer 912 via the switch 911. When the state of the switch 911 is the OFF state, the switch 911 disconnects the buffer 910 and the buffer 912 from each other. At this time, none of the voltages are output from the buffer 910 to the buffer 912.

The state of the switch 911 is controlled based on the control signal EN. When the voltage of the control signal EN is the H level, the state of the switch 911 is set to the ON state. When the voltage of the control signal EN is the L level, the state of the switch 911 is set to the OFF state.

The buffer 912 is connected to the imager 901, the switch 911, and the video terminal 908. The buffer 912 outputs either the video signal output from the imager 901 or the voltage output from the buffer 910 to the video terminal 908. The buffer 912 outputs the reference voltage VBGR, the voltage VH, and the voltage VL output from the buffer 910 in the voltage-monitoring period to the video terminal 908. The buffer 912 outputs the video signal output from the imager 901 in the video output period to the video terminal 908.

The video terminal 908 is connected to the buffer 912 and the video signal line 31. The reference voltage VBGR, the voltage VH, and the voltage VL output from the buffer 912 are input to the video terminal 908 in the voltage-monitoring period. The video signal output from the buffer 912 is input to the video terminal 908 in the video output period. The video terminal 908 outputs the reference voltage VBGR, the voltage VH, and the voltage VL to the video signal line 31 in the voltage-monitoring period. The video terminal 908 outputs the video signal to the video signal line 31 in the video output period. A voltage VO of the video terminal 908 is the reference voltage VBGR, the voltage VH, the voltage VL, or the voltage of the video signal.

The video signal line 31 is a signal line disposed in the transmission cable 3. The video signal line 31 transfers the reference voltage VBGR, the voltage VH, and the voltage VL output from the video terminal 908 to the control unit 6 in the voltage-monitoring period. The video signal line 31 transfers the video signal to the control unit 6 in the video output period.

The video terminal 606 is connected to the video signal line 31. The video terminal 606 is disposed at a point connecting the video signal line 31 and the control unit 6. The reference voltage VBGR, the voltage VH, the voltage VL, and the video signal transferred by the video signal line 31 are input to the video terminal 606.

The resistor 601 is connected to the video terminal 606. The resistor 601 is a terminal resistor.

The AFE 602 is connected to the video terminal 606. The AFE 602 receives the reference voltage VBGR, the voltage VH, and the voltage VL in the voltage-monitoring period. The AFE 602 receives the video signal in the video output period.

The AFE 602 includes an analog-to-digital converter and converts the received analog signal to a digital signal. The AFE 602 processes digital signals of the reference voltage VBGR, the voltage VH, the voltage VL, and the video signal. For example, the AFE 602 performs predetermined signal processing on the video signal. In addition, the AFE 602 measures a value of the difference (VH−VBGR) between the voltage VH and the reference voltage VBGR and measures a value of the difference (VH−VL) between the voltage VH and the voltage VL. The AFE 602 outputs the measured values to the control value calculation circuit 603.

The control value calculation circuit 603 calculates a ratio of the difference (VH−VBGR) to the difference (VH−VL). The ratio is expressed as (VH−VBGR)/(VH−VL).

A voltage drop is generated due to the DC resistance of the video signal line 31, and the reference voltage VBGR, the voltage VH, and the voltage VL are attenuated. The control value calculation circuit 603 can eliminate an influence of the attenuated voltages by calculating the ratio (VH−VBGR)/(VH−VL).

In the first period included in the voltage-monitoring period, the voltage generation circuit 902 generates the reference voltage VBGR, and the resistance circuit 903 generates a voltage VH1 and a voltage VL1. The voltage VH1 and the voltage VL1 correspond to the first voltage. The capacitance circuit 905 holds the reference voltage VBGR, the voltage VH1, and the voltage VL1 in the first period.

The imager 901 is not activated in the first period. In addition, the state of the buffer 910 is set to the OFF state in the first period. When the buffer 910 is in the ON state, the buffer 910 consumes a great deal of current. Since the imager 901 is not activated and the state of the buffer 910 is the OFF state, the amount of current consumption of the camera unit 9 in the first period is extremely small. Therefore, a current hardly flows through the power source line 30 in the first period, and a voltage drop in the power source line 30 is hardly generated. In other words, the second power source voltage Vcis is almost the same as the first power source voltage Vout.

After the capacitance circuit 905 holds the reference voltage VBGR, the voltage VH1, and the voltage VL1, the state of the buffer 910 is set to the ON state. The reference voltage VBGR, the voltage VH1, and the voltage VL1 are transferred to the control unit 6 by the video signal line 31. The reference voltage VBGR, the voltage VH1, and the voltage VL1 correspond to the first signal. The AFE 602 measures a value of the difference (VH1−VBGR) between the voltage VH1 and the reference voltage VBGR and measures a value of the difference (VH1−VL1) between the voltage VH1 and the voltage VL1. The control value calculation circuit 603 calculates a first ratio of the value of the difference (VH1−VBGR) to the value of the difference (VH1−VL1). The first ratio is expressed as (VH1−VBGR)/(VH1−VL1).

In the second period included in the voltage-monitoring period, the voltage generation circuit 902 generates the reference voltage VBGR, and the resistance circuit 903 generates a voltage VH2 and a voltage VL2. The voltage VH2 and the voltage VL2 correspond to the second voltage. The capacitance circuit 905 holds the reference voltage VBGR, the voltage VH2, and the voltage VL2 in the second period.

The imager 901 may be activated in the second period. In addition, the state of the buffer 910 is maintained to be the ON state in the second period. Since the buffer 910 consumes a great deal of current, the amount of current consumption of the camera unit 9 in the second period is greater than that of current consumption of the camera unit 9 in the first period. Since a current flows through the power source line 30 in the second period, a voltage drop is generated in the power source line 30. In other words, the second power source voltage Vcis is lower than the first power source voltage Vout. The voltage VH2 is lower than the voltage VH1, and the voltage VL2 is lower than the voltage VL1. The reference voltage VBGR in the second period is the same as that in the first period.

The reference voltage VBGR, the voltage VH2, and the voltage VL2 are transferred to the control unit 6 by the video signal line 31. The reference voltage VBGR, the voltage VH2, and the voltage VL2 correspond to the second signal. The AI+, 602 measures a value of the difference (VH2−VBGR) between the voltage VH2 and the reference voltage VBGR and measures a value of the difference (VH2−VL2)

between the voltage VH2 and the voltage VL2. The control value calculation circuit 603 calculates a second ratio of the value of the difference (VH2−VBGR) to the value of the difference (VH2−VL2). The second ratio is expressed as (VH2−VBGR)/(VH2−VL2).

The control value calculation circuit 603 calculates a control value of the first power source voltage Vout by using the first ratio and the second ratio. Specifically, the control value calculation circuit 603 calculates a control value for causing the second ratio to match the first ratio. The control value calculation circuit 603 outputs the calculated control value to the voltage adjustment circuit 604. The voltage adjustment circuit 604 controls the voltage generation circuit 600 based on the control value, thus adjusting the value of the first power source voltage Vout to be generated by the voltage generation circuit 600.

The voltage VH1 and the voltage VL1 are generated based on the optimal second power source voltage Vcis in the first period. In order for the second ratio to match the first ratio, the voltage VH2 needs to match the voltage VH1 and the voltage VL2 needs to match the voltage VL1. The endoscope system 1 can cause the value of the second power source voltage Vcis to match the value of the optimal second power source voltage Vcis by controlling the voltage generation circuit 600 based on the control value calculated by the control value calculation circuit 603.

The control value calculation circuit 603 is a digital circuit including at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). The control value calculation circuit 603 may include one or a plurality of processors. The control value calculation circuit 603 may include one or a plurality of logic circuits.

The control value calculation circuit 603 may read a program and execute the read program. The program includes commands defining the operations of the control value calculation circuit 603. In other words, the functions of the control value calculation circuit 603 may be realized by software. The program may be transmitted from a computer storing the program to the endoscope system 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

The imager 901 is not activated in the first period. The circuit unit 900 outputs the control signal CTL to the imager 901 at a timing at which the first period is completed. The imager 901 may be activated based on the control signal CTL. At this time, the second period is started.

Figure 4:
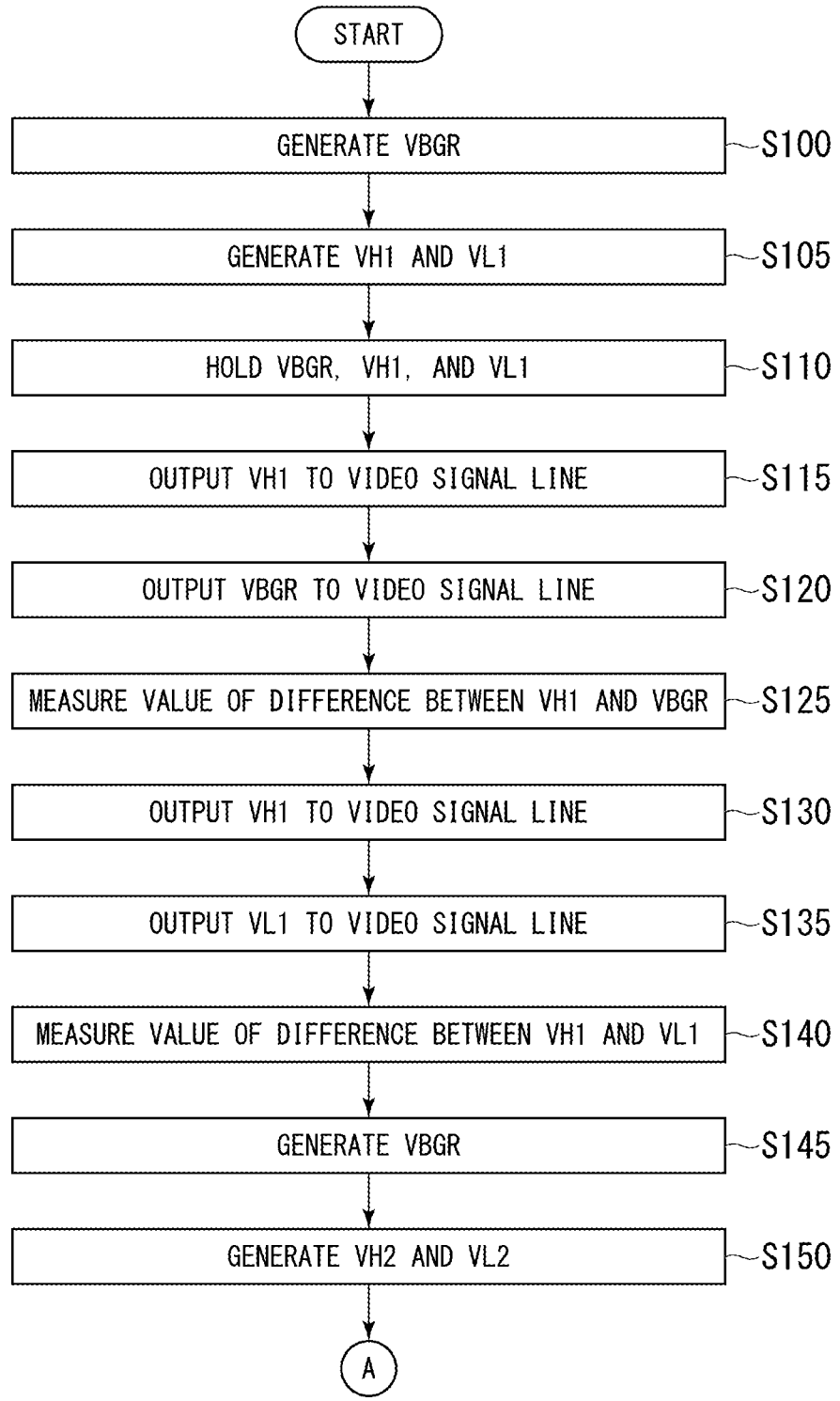
FIG. 4 is a flow chart showing a procedure of an operation of the endoscope system according to the first embodiment of the present invention.
Figure 5:
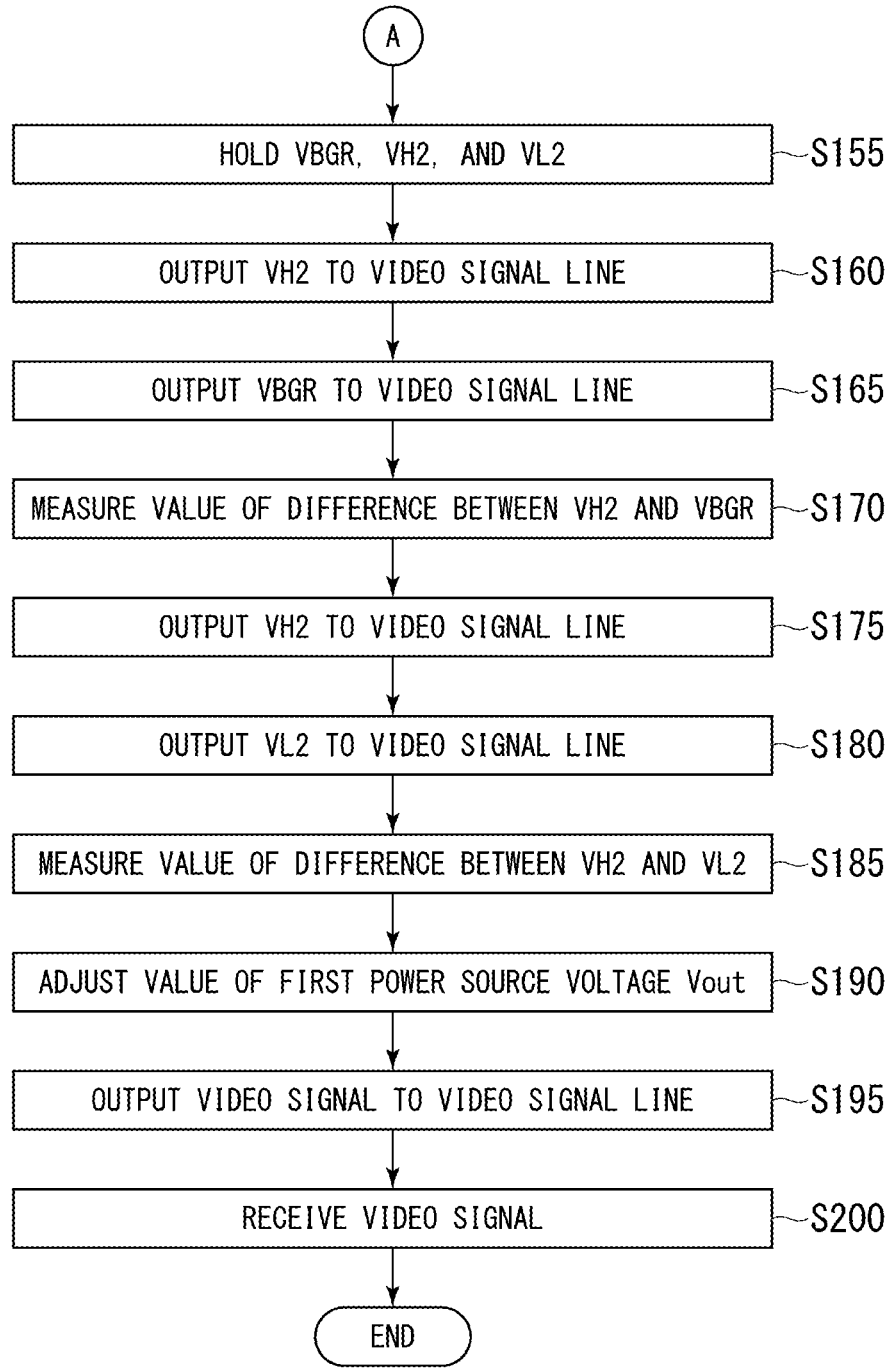
FIG. 5 is a flow chart showing a procedure of an operation of the endoscope system according to the first embodiment of the present invention.
Figure 6:
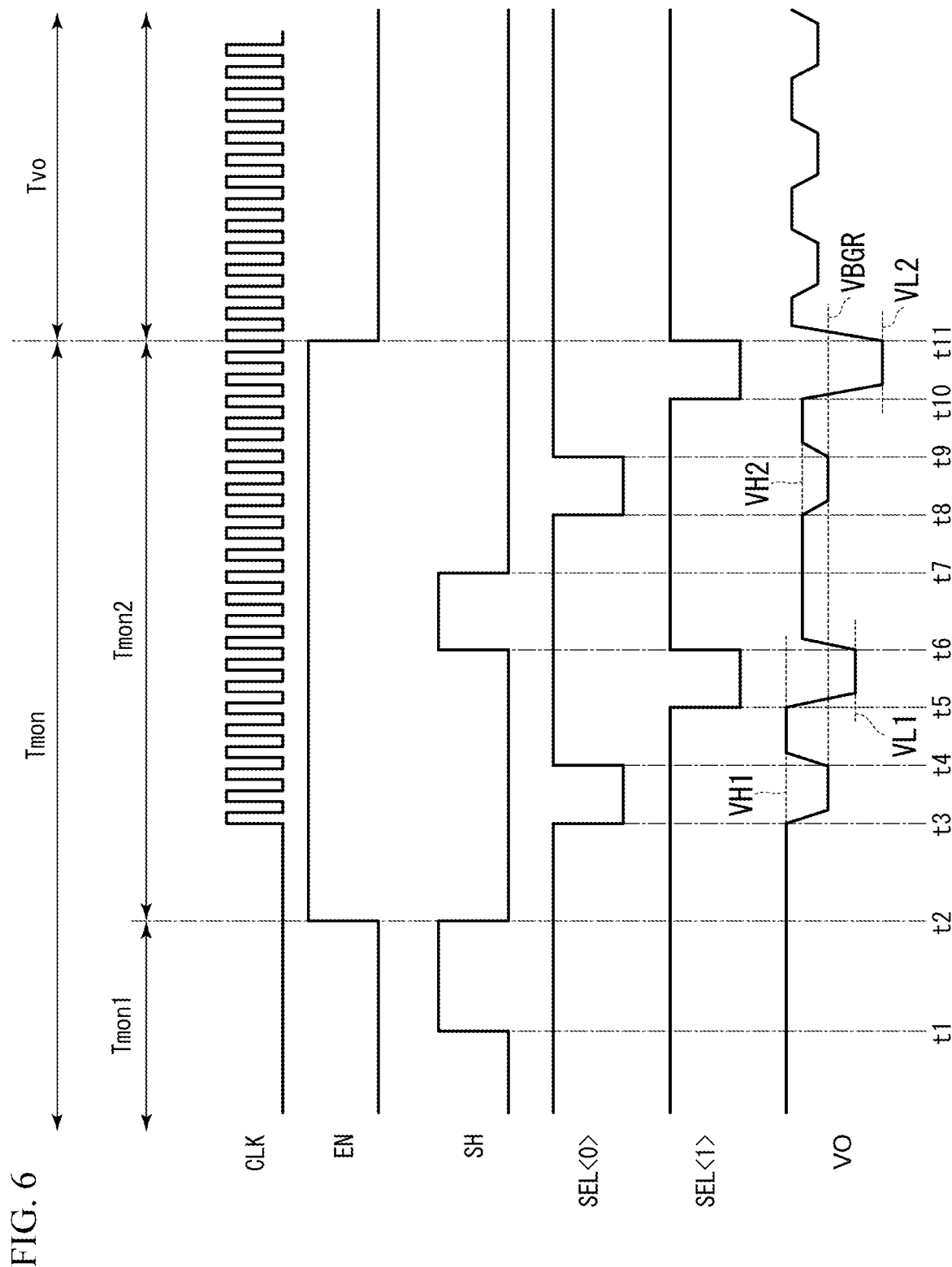
FIG. 6 is a timing chart showing a waveform of each signal in the endoscope system according to the first embodiment of the present invention.

FIG. 4 and FIG. 5 show a procedure of an operation of the endoscope system 1. FIG. 6 shows waveforms of the clock CLK, the control signal EN, the control signal SH, the control signal SEL<0>, the control signal SEL<1>, and the voltage VO. The horizontal direction in FIG. 6 indicates time, and the vertical direction in FIG. 6 indicates a voltage value of each signal. The operation of the endoscope system 1 will be described by using FIG. 4, FIG. 5, and FIG. 6.

FIG. 6 shows a waveform of each signal in a voltage-monitoring period Tmon and a video output period Tvo. The voltage-monitoring period Tmon includes a first period Tmon1 and a second period Tmon2.

When the first period Tmon1 shown in FIG. 6 is started, the voltage of each of the control signals EN and SH is the L level. The voltage of each of the control signals SEL<0> and SEL<1> is the H level. The state of each of the buffer 910 and the switch 911 is set to the OFF state. The state of each of the switches SW1, SW2, and SW3 is set to the OFF state.

The voltage generation circuit 902 generates the reference voltage VBGR in the first period Tmon1 (Step S100). The resistance circuit 903 generates the voltage VH1 and the voltage VL1 in the first period Tmon1 (Step S105).

The voltage of the control signal SH is set to the H level at a time point t1. The state of each of the switches SW1, SW2, and SW3 changes to the ON state at the time point t1. The reference voltage VBGR is input to the capacitor C1, the voltage VH1 is input to the capacitor C2, and the voltage VL1 is input to the capacitor C3. Thereafter, the voltage of the control signal SH is set to the L level at a time point t2. The state of each of the switches SW1, SW2, and SW3 changes to the OFF state at the time point t2. The capacitor C1 holds the reference voltage VBGR, the capacitor C2 holds the voltage VH1, and the capacitor C3 holds the voltage VL1 (Step S110).

The voltage of the control signal EN is set to the H level at the time point t2. The state of each of the buffer 910 and the switch 911 changes to the ON state at the time point t2. At this time, the first period Tmon1 is completed, and the second period Tmon2 is started.

The selection circuit 909 selects the voltage VH1 at the time point t2. The buffer 912 outputs the voltage VH1 to the video signal line 31 via the video terminal 908 (Step S115). The voltage VH1 is transferred to the control unit 6 by the video signal line 31. The AFE 602 receives the voltage VH1.

The voltage of the control signal SEL<0> is set to the L level at a time point t3. The selection circuit 909 selects the reference voltage VBGR. The buffer 912 outputs the reference voltage VBGR to the video signal line 31 via the video terminal 908 (Step S120).

The reference voltage VBGR is transferred to the control unit 6 by the video signal line 31. The AFE 602 receives the reference voltage VBGR. The AFE 602 measures a value of the difference between the voltage VH1 and the reference voltage VBGR (Step S125).

The voltage of the control signal SEL<0> is set to the H level at a time point t4. The selection circuit 909 selects the voltage VH1. The buffer 912 outputs the voltage VH1 to the video signal line 31 via the video terminal 908 (Step S130). The voltage VH1 is transferred to the control unit 6 by the video signal line 31. The AFE 602 receives the voltage VH1.

The voltage of the control signal SEL<1> is set to the L level at a time point t5. The selection circuit 909 selects the voltage VL1. The buffer 912 outputs the voltage VL1 to the video signal line 31 via the video terminal 908 (Step S135).

The voltage VL1 is transferred to the control unit 6 by the video signal line 31. The AFE 602 receives the voltage VL1. The AFE 602 measures a value of the difference between the voltage VH1 and the voltage VL1 (Step S140).

The voltage generation circuit 902 generates the reference voltage VBGR in the second period Tmon2 (Step S145). The resistance circuit 903 generates the voltage VH2 and the voltage VL2 in the second period Tmon2 (Step S150).

The voltage of the control signal SEL<1> is set to the H level at a time point t6. The voltage of the control signal SH is set to the H level at the time point t6. The time point t6 indicates a timing at which the number that is counted based on the clock CLK matches a predetermined number. The state of each of the switches SW1, SW2, and SW3 changes to the ON state at the time point t6. The reference voltage VBGR is input to the capacitor C1, the voltage VH2 is input to the capacitor C2, and the voltage VL2 is input to the capacitor C3.

Thereafter, the voltage of the control signal SH is set to the L level at a time point t7. The time point t7 indicates a timing at which the number that is counted based on the clock CLK matches a predetermined number. The state of each of the switches SW1, SW2, and SW3 changes to the OFF state at the time point t7. The capacitor C1 holds the reference voltage VBGR, the capacitor C2 holds the voltage VH2, and the capacitor C3 holds the voltage VL2 (Step S155).

The selection circuit 909 selects the voltage VH2 at the time point t7. The buffer 912 outputs the voltage VH2 to the video signal line 31 via the video terminal 908 (Step S160).

The voltage VH2 is transferred to the control unit 6 by the video signal line 31. The AFE 602 receives the voltage VH2.

The voltage of the control signal SEL<0> is set to the L level at a time point t8. The selection circuit 909 selects the reference voltage VBGR. The buffer 912 outputs the reference voltage VBGR to the video signal line 31 via the video terminal 908 (Step S165).

The reference voltage VBGR is transferred to the control unit 6 by the video signal line 31. The AFE 602 receives the reference voltage VBGR. The AFE 602 measures a value of the difference between the voltage VH2 and the reference voltage VBGR (Step S170).

The voltage of the control signal SEL<0> is set to the H level at a time point t9. The selection circuit 909 selects the voltage VH2. The buffer 912 outputs the voltage VH2 to the video signal line 31 via the video terminal 908 (Step S175). The voltage VH2 is transferred to the control unit 6 by the video signal line 31. The AFE 602 receives the voltage VH2.

The voltage of the control signal SEL<1> is set to the L level at a time point t10. The selection circuit 909 selects the voltage VL2. The buffer 912 outputs the voltage VL2 to the video signal line 31 via the video terminal 908 (Step S180).

The voltage VL2 is transferred to the control unit 6 by the video signal line 31. The AFE 602 receives the voltage VL2. The AFE 602 measures a value of the difference between the voltage VH2 and the voltage VL2 (Step S185).

The voltage of the control signal EN is set to the L level at a time point t1 The voltage of the control signal SEL<1> is set to the H level at the time point t11. The state of each of the buffer 910 and the switch 911 changes to the OFF state at the time point t11. At this time, the voltage-monitoring period Tmon is completed, and the video output period Tvo is started. The time point t11 indicates a timing at which the number that is counted based on the clock CLK matches a predetermined number.

The control value calculation circuit 603 calculates the first ratio of the value of the difference (VH1−VBGR) to the value of the difference (VH1−VL1). The control value calculation circuit 603 calculates the second ratio of the value of the difference (VH2−VBGR) to the value of the difference (VH2−VL2). The control value calculation circuit 603 calculates a control value for causing the second ratio to match the first ratio. The voltage adjustment circuit 604 adjusts the value of the first power source voltage Vout based on the control value (Step S190).

The buffer 912 outputs the video signal to the video signal line 31 via the video terminal 908 (Step S195). The video signal is transferred to the control unit 6 by the video signal line 31. The AFE 602 receives the video signal (Step S200).

The power source of the imager 901 may be turned off in the video output period Tvo, and then the imager 901 may be activated again. At this time, the operation shown in FIG. 4 and FIG. 5 may be executed.

When the capacitance circuit 905 holds the reference voltage VBGR, the voltage VH1, and the voltage VL1, the imager 901 and the buffer 910 have stopped the operation. At this time, the voltage generation circuit 902 is operating. The amount of current consumption of the voltage generation circuit 902 is 80 to 120 microamperes. The resistance value of the power source line 30 is 4 to 8 ohms. The value of a voltage drop in the power source line 30 is about 1 mV. When a target value of the second power source voltage Vcis is 3.3 V, the voltage drop in the power source line 30 does not cause a significant error in the second power source voltage Vcis.

An imaging method according to each aspect of the present invention includes a voltage generation step, a reference voltage generation step, and an output step. The resistance circuit 903 (voltage generation circuit) generates the first voltage by using the second power source voltage Vcis in the first period and generates the second voltage different from the first voltage by using the second power source voltage Vcis in the second period different from the first period (voltage generation step (Step S105 and Step S150)). The voltage generation circuit 902 (reference voltage generation circuit) generates the reference voltage VBGR (reference voltage generation step (Step S100 and Step S145)). The output circuit 906 outputs the first signal (the reference voltage VBGR, the voltage VH1, and the voltage VL1) indicating both the first voltage and the reference voltage to the video signal line 31 and outputs the second signal (the reference voltage VBGR, the voltage VH2, and the voltage VL2) indicating both the second voltage and the reference voltage to the video signal line 31 (output step (Step S115, Step S120, Step S130, Step S135, Step S160, Step S165, Step S175, and Step S180)).

Each aspect of the present invention may include the following modified example. The first period is before a timing at which the imager 901 is activated. The second period is after the timing.

Each aspect of the present invention may include the following modified example. The first period is before a tinting at which the control signal CTL used for activating the imager 901 is input to the imager 901. The second period is after the timing.

Each aspect of the present invention may include the following modified example. The capacitor C1, the capacitor C2, and the capacitor C3 hold the first voltage (the voltage VH1 and the voltage VL1), the second voltage (the voltage VH2 and the voltage VL2), and the reference voltage VBGR. The first signal is generated based on the first voltage and the reference voltage VBGR held in these capacitors. The second signal is generated based on the second voltage and the reference voltage VBGR held in these capacitors.

Each aspect of the present invention may include the following modified example. The resistor R2 (first resistor) generates the first voltage (voltage VH1) in the first period and generates the second voltage (voltage VH2) in the second period. The resistor R3 (second resistor) generates a third voltage (voltage VL1) different from the first voltage in the first period and generates a fourth voltage (voltage VL2)

different from the second voltage in the second period. The output circuit 906 outputs the first signal indicating the reference voltage VBGR, the first voltage, and the third voltage generated in the first period to the video signal line 31. The output circuit 906 outputs the second signal indicating the reference voltage VBGR, the second voltage, and the fourth voltage generated in the second period to the video signal line 31.

In the first embodiment, the endoscope system 1 can control a power source voltage (second power source voltage Vcis) provided to the imager 901 with high accuracy. The video signal line 31 transfers the first signal and the second signal used for adjusting the value of the first power source voltage Vout. Since a dedicated cable for transferring the first signal and the second signal is unnecessary, the endoscope system 1 is suitable for the miniaturization of the camera unit 9.

The endoscope system 1 can control the second power source voltage Vcis with high accuracy without being affected by the deviations of the reference voltage VBGR generated by the voltage generation circuit 902 or the deviations of the gain of the output circuit 906.

Second Embodiment

Figure 7:
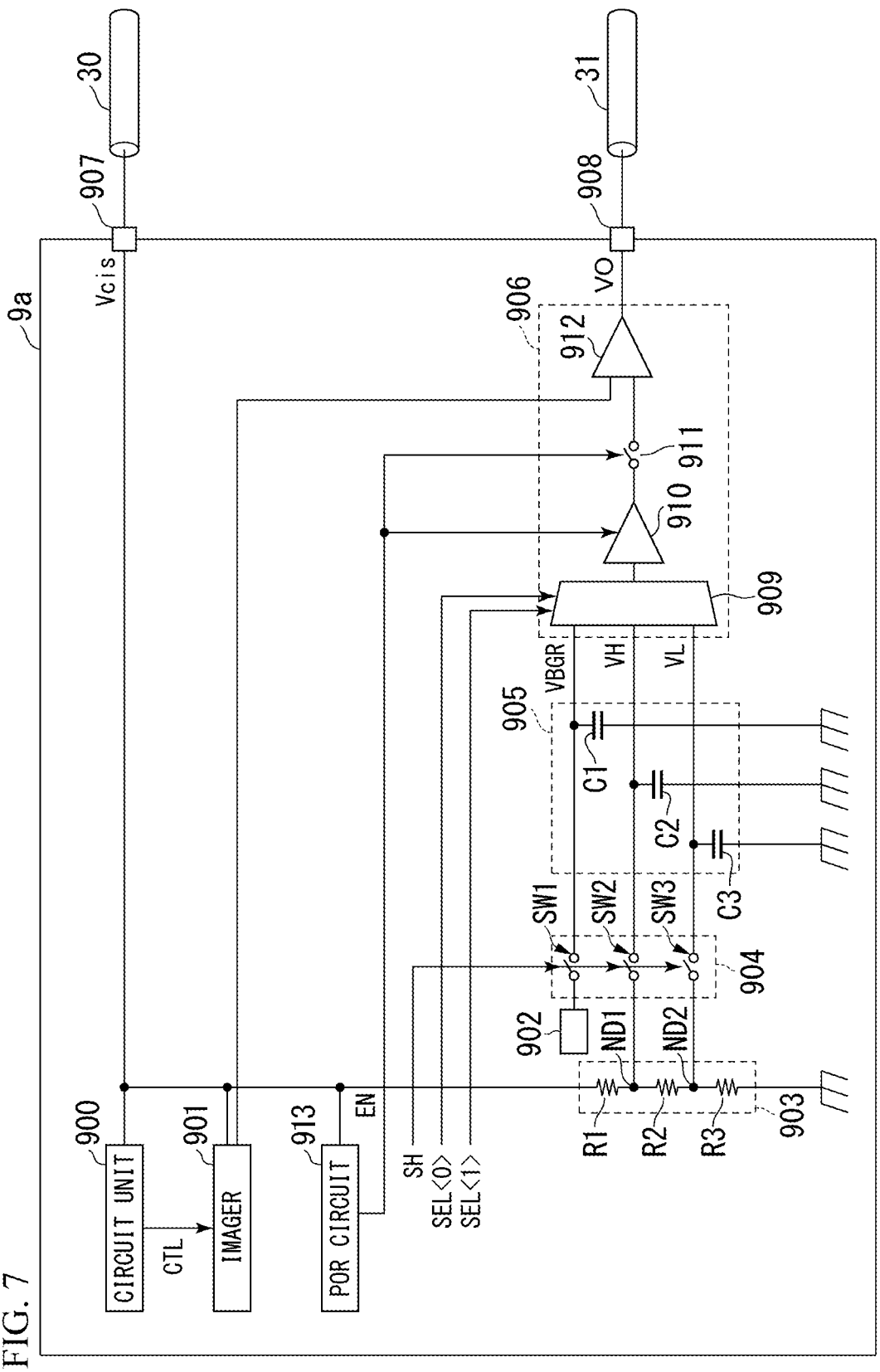
FIG. 7 is a block diagram showing a configuration of a camera unit included in an endoscope system according to a second embodiment of the present invention.

FIG. 7 shows a configuration of a camera unit 9a according to a second embodiment of the present invention. The same parts as those shown in FIG. 2 will not be described.

The camera unit 9a includes a circuit unit 900, an imager 901, a voltage generation circuit 902, a resistance circuit 903, a switch circuit 904, a capacitance circuit 905, an output circuit 906, a power source terminal 907, a video terminal 908, and a power-on-reset (POR) circuit 913. The resistance circuit 903 includes a resistor R1, a resistor R2, and a resistor R3. The switch circuit 904 includes a switch SW1, a switch SW2, and a switch SW3. The capacitance circuit 905 includes a capacitor C1, a capacitor C2, and a capacitor C3. The output circuit 906 includes a selection circuit 909, a buffer 910, a switch 911, and a buffer 912.

The POR circuit 913 monitors the second power source voltage Vcis input to the power source terminal 907. The POR circuit 913 generates the control signal EN based on the value of the second power source voltage Vcis.

Figure 8:
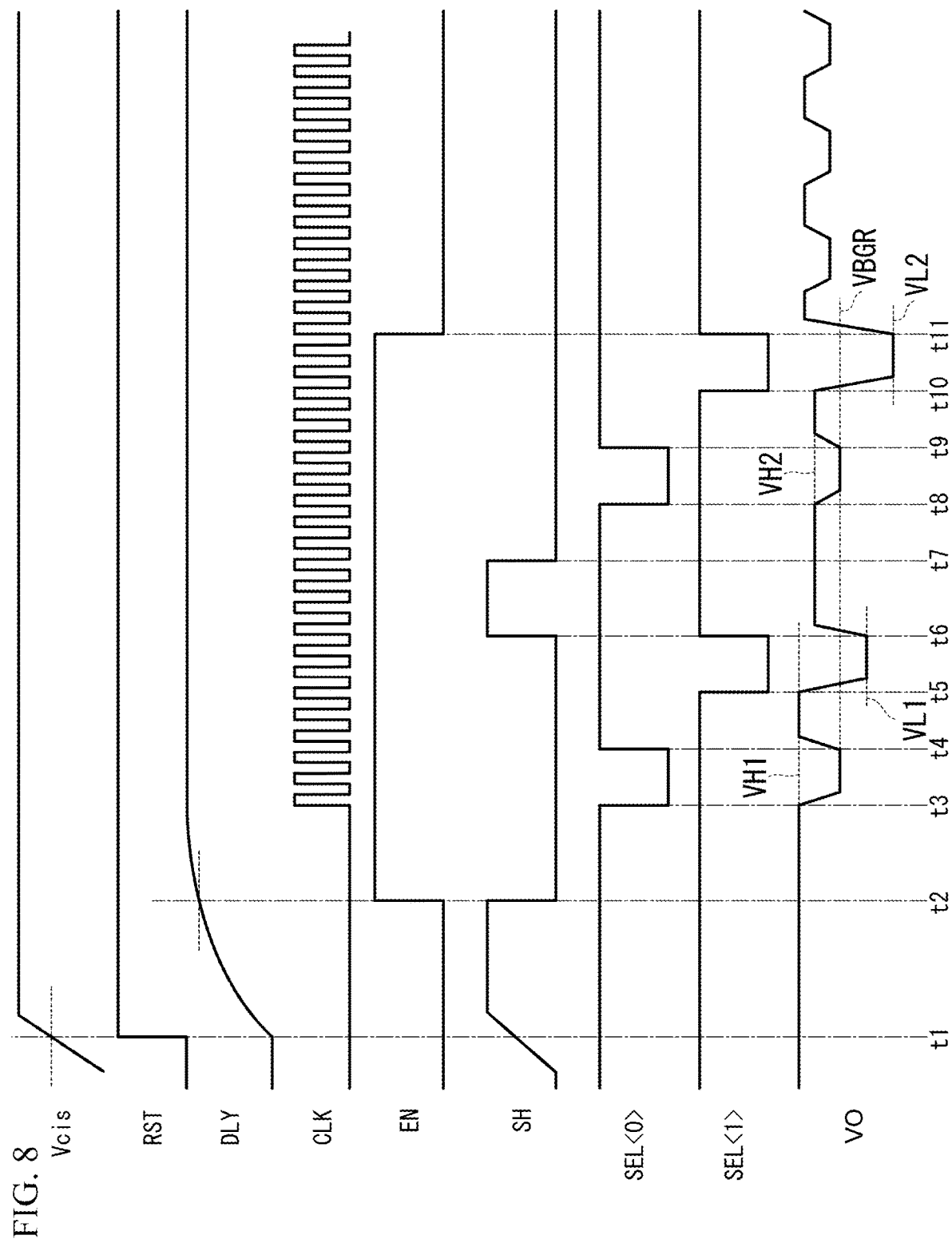
FIG. 8 is a timing chart showing a waveform of each signal in the endoscope system according to the second embodiment of the present invention.

FIG. 8 shows waveforms of the second power source voltage Vcis, a reset signal RST, a signal DLY, the clock CLK, the control signal EN, the control signal SH, the control signal SEL<0>, the control signal SEL<1>, and the voltage VO. The horizontal direction in FIG. 8 indicates time, and the vertical direction in FIG. 8 indicates a voltage value of each signal. An operation of the endoscope system 1 in the second embodiment will be described by using FIG. 8. The same parts as those shown in FIG. 6 will not be described.

An initial voltage of each of the reset signal RST, the signal DLY, the control signal EN, and the control signal SH shown in FIG. 8 is the L level. After the voltage generation circuit 600 of the control unit 6 starts the generation of the first power source voltage Vout, the second power source voltage Vcis gradually increases. The voltage of the control signal SH increases in accordance with the increase of the second power source voltage Vcis. When the value of the second power source voltage Vcis matches a predetermined value, the POR circuit 913 sets the voltage of the reset signal RST to the H level (tune point t1).

After the time point t1, the POR circuit 913 gradually increases the voltage of the signal DLY. When the value of the voltage of the signal DLY matches a predetermined value, the POR circuit 913 sets the voltage of the control signal EN to the H level (time point t2). The voltage of the control signal SH is set to the L level at the time point t2.

At a time point t11, the number that is counted based on the clock CLK matches a predetermined number. At this time, the POR circuit 913 sets the voltage of the control signal EN to the L level.

In the second embodiment, the POR circuit 913 generates the control signal EN in accordance with the value of the second power source voltage Vcis. When the voltage of the control signal EN is the L level, the imager 901 and the buffer 910 have stopped the operation. Before the imager 901 and the buffer 910 start the operation, the capacitance circuit 905 can hold the reference voltage VBGR, the voltage VH1, and the voltage VL1.

Third Embodiment

Figure 9:
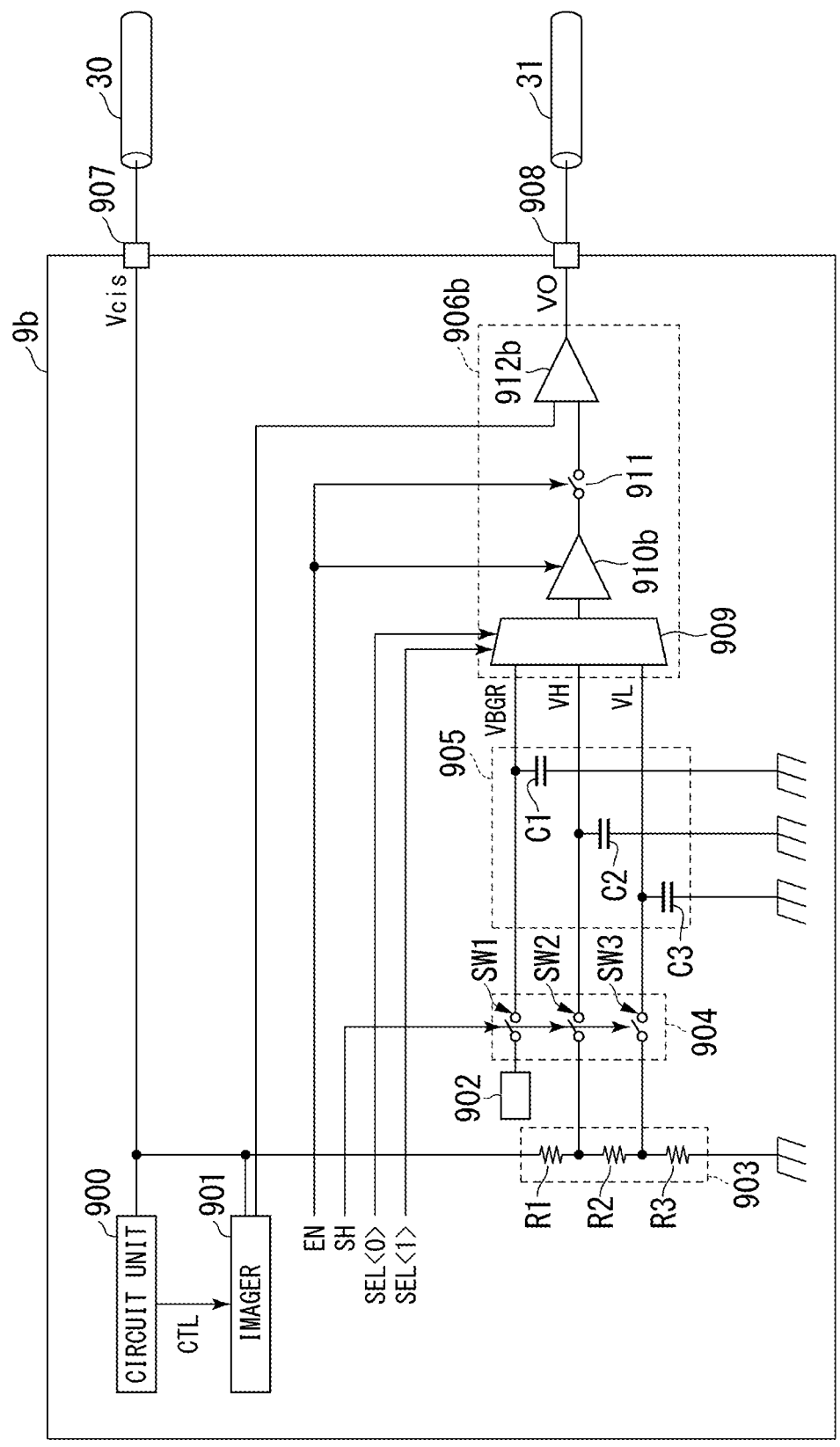
FIG. 9 is a block diagram showing a configuration of a camera unit included in an endoscope system according to a third embodiment of the present invention.

FIG. 9 shows a configuration of a camera unit 9b according to a third embodiment of the present invention. The same parts as those shown in FIG. 2 will not be described.

The camera unit 9b includes a circuit unit 900, an imager 901, a voltage generation circuit 902, a resistance circuit 903, a switch circuit 904, a capacitance circuit 905, an output circuit 906b, a power source terminal 907, and a video terminal 908. The resistance circuit 903 includes a resistor R1, a resistor R2, and a resistor R3. The switch circuit 904 includes a switch SW1, a switch SW2, and a switch SW3. The capacitance circuit 905 includes a capacitor C1, a capacitor C2, and a capacitor C3. The output circuit 906b includes a selection circuit 909, a buffer 910b, a switch 911, and a buffer 912b.

The buffer 910b is connected to the selection circuit 909 and the switch 911. The state of the buffer 910b becomes any one of an ON state and an OFF state. The buffer 910b can switch between the ON state and the OFF state. Each state of the buffer 910b is the same as that of the buffer 910 shown in FIG. 2.

The buffer 910b functions as an analog-to-digital (AD) converter that performs AD conversion on the voltage output from the selection circuit 909. The buffer 910b generates a digital signal (digital difference signal) indicating the value of the difference (VH−VBGR) between the voltage VH and the reference voltage VBGR. Specifically, the buffer 910b generates a digital difference signal indicating the value of the difference (VH1−VBGR) between the voltage VH1 and the reference voltage VBGR and generates a digital difference signal indicating the value of the difference (VH2−VBGR) between the voltage VH2 and the reference voltage VBGR.

In addition, the buffer 910b generates a digital signal (digital difference signal) indicating the value of the difference (VH−VL) between the voltage VH and the voltage VL. Specifically, the buffer 910b generates a digital difference signal indicating the value of the difference (VH1−VL1) between the voltage VH1 and the voltage VL1 and generates a digital difference signal indicating the value of the difference (VH2−VL2) between the voltage VH2 and the voltage VL2. The buffer 910b outputs each of the generated digital difference signals to the buffer 912b via the switch 911.

The buffer 912b is connected to the imager 901, the switch 911, and the video terminal 908. The buffer 912b functions as an AD converter that performs AD conversion on the video signal output from the imager 901 so as to generate a digital video signal. The buffer 912b outputs one of the digital video signal and the digital difference signal to the video terminal 908. The buffer 912b outputs the digital difference signal to the video terminal 908 in the voltage-monitoring period. The buffer 912b outputs the digital video signal to the video terminal 908 in the video output period.

The video terminal 908 outputs the digital difference signal to the video signal line 31 in the voltage-monitoring period. The video terminal 908 outputs the digital video signal to the video signal line 31 in the video output period.

The video signal line 31 transfers the digital difference signal to the control unit 6 in the voltage-monitoring period. The video signal line 31 transfers the digital video signal to the control unit 6 in the video output period.

The AFE 602 of the control unit 6 is changed to a signal reception circuit that receives a digital signal. The signal reception circuit receives the digital difference signal in the voltage-monitoring period. The signal reception circuit receives the digital video signal in the video output period. The signal reception circuit executes the same processing as that in the first embodiment based on the digital difference signal.

While the digital difference signal is transferred from the camera unit 9b to the control unit 6, the voltage value indicated by the digital difference signal does not change. Therefore, the control value calculation circuit 603 does not need to calculate the first ratio of the value of the difference (VH1−VBGR) to the value of the difference (VH1−VL1) and does not need to calculate the second ratio of the value of the difference (VH2−VBGR) to the value of the difference (VH2−VL2). The control value calculation circuit 603 may calculate a control value of the first power source voltage Vout by using the value of the difference (VH1−VBGR) and the value of the difference (VH2−VBGR). Specifically, the control value calculation circuit 603 may calculate a control value for causing the value of the difference (VH2−VBGR) to match the value of the difference (VH1−VBGR). The reference voltage VBGR and the voltage VH1 correspond to the first signal. The reference voltage VBGR and the voltage VH2 correspond to the second signal.

In a case in which the control value calculation circuit 603 uses the value of the difference (VH1−VBGR) and the value of the difference (VH2−VBGR), a circuit that generates and holds the voltage VL is unnecessary. Therefore, the resistance circuit 903 does not need to include the resistor R3. The switch circuit 904 does not need to include the switch SW3. The capacitance circuit 905 does not need to include the capacitor C3.

Each aspect of the present invention may include the following modified example. The output circuit 906b includes an AD converter (the buffer 910b and the buffer 912b) that performs AD conversion on each of the first signal, the second signal, and the video signal.

In the third embodiment, the output circuit 906b outputs the digital difference signal to the video signal line 31. Therefore, the endoscope system 1 can control the second power source voltage Vcis with high accuracy without being affected by the attenuated voltage in the video signal line 31. In addition, the accuracy of voltage values is improved since the endoscope system 1 performs AD conversion on the difference between the voltage VH and the reference voltage VBGR without performing AD conversion on each of the voltage VH and the reference voltage VBGR.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device connected to a control unit by both a power source line that transfers a first power source voltage and a video signal line that transfers a video signal, the first power source voltage transferred from the control unit by the power source line being input to the imaging device as a second power source voltage, the imaging device comprising:
    an image sensor configured to generate the video signal by using the second power source voltage;
    a voltage generation circuit configured to generate a first voltage by using the second power source voltage in a first period and generate a second voltage different from the first voltage by using the second power source voltage in a second period different from the first period;
    a reference voltage generation circuit configured to generate a reference voltage; and
    an output circuit configured to output a first signal indicating the first voltage and the reference voltage to the video signal line and output a second signal indicating the second voltage and the reference voltage to the video signal line, and
    wherein an amount of current consumption in the imaging device in the first period is less than an amount of current consumption in the imaging device in the second period.

2. The imaging device according to claim 1,
    wherein the first period is before a timing at which the image sensor is activated, and
    wherein the second period is after the timing.

3. The imaging device according to claim 1,
    wherein the first period is before a timing at which a control signal used for activating the image sensor is input to the image sensor, and
    wherein the second period is after the timing.

4. The imaging device according to claim 1, further comprising a capacitor configured to hold the first voltage, the second voltage, and the reference voltage,
    wherein the first signal is generated based on the first voltage and the reference voltage held in the capacitor, and
    wherein the second signal is generated based on the second voltage and the reference voltage held in the capacitor.

5. The imaging device according to claim 1,
    wherein the voltage generation circuit includes:
        a first resistor configured to generate the first voltage in the first period and generate the second voltage in the second period; and
        a second resistor configured to generate a third voltage different from the first voltage in the first period and generate a fourth voltage different from the second voltage in the second period,
    wherein the output circuit is configured to output the first signal indicating the reference voltage, the first voltage, and the third voltage generated in the first period to the video signal line, and
    wherein the output circuit is configured to output the second signal indicating the reference voltage, the second voltage, and the fourth voltage generated in the second period to the video signal line.

6. The imaging device according to claim 1,
wherein the output circuit includes an analog-to-digital (AD) converter that performs AD conversion on each of the first signal, the second signal, and the video signal.

7. An imaging system, comprising:
the imaging device according to claim 1; and
a control unit connected to the imaging device by the power source line and the video signal line,
wherein the control unit includes:
- a power source voltage generation circuit configured to generate the first power source voltage and output the generated first power source voltage to the power source line;
- a signal reception circuit configured to receive the video signal, the first signal, and the second signal output to the video signal line; and
- a voltage adjustment circuit configured to adjust a value of the first power source voltage based on both a value of a voltage of the first signal received by the signal reception circuit and a value of a voltage of the second signal received by the signal reception circuit.

8. A scope to be inserted into a living body, the scope comprising the imaging device according to claim 1,
wherein the imaging device is disposed in a distal end of the scope.

9. An endoscope system, comprising
a scope to be inserted into a living body; and
the imaging system according to claim 7,
wherein the imaging device is disposed in a distal end of the scope.

10. An imaging method in an imaging device connected to a control unit by both a power source line that transfers a first power source voltage and a video signal line that transfers a video signal, the first power source voltage transferred from the control unit by the power source line being input to the imaging device as a second power source voltage used for driving an image sensor of the imaging device, the method comprising:
- a voltage generation step in which a voltage generation circuit generates a first voltage by using the second power source voltage in a first period and generates a second voltage different from the first voltage by using the second power source voltage in a second period different from the first period;
- a reference voltage generation step in which a reference voltage generation circuit generates a reference voltage; and
- an output step in which an output circuit outputs a first signal indicating the first voltage and the reference voltage to the video signal line and outputs a second signal indicating the second voltage and the reference voltage to the video signal line,
wherein an amount of current consumption in the imaging device in the first period is less than an amount of current consumption in the imaging device in the second period.

* * * * *